United States Patent
Jordil et al.

(10) Patent No.: US 6,751,884 B2
(45) Date of Patent: Jun. 22, 2004

(54) COLUMN FOR MEASURING LONGITUDINAL DIMENSIONS

(75) Inventors: Pascal Jordil, Ecoteaux (CH); Adriano Zanier, Prilly (CH); Charles-Henri Zufferey, Erde (CH)

(73) Assignee: Brown & Sharpe TESA SA, Renens (CH)

( * ) Notice: Subject to any disclaimer, the term of this patent is extended or adjusted under 35 U.S.C. 154(b) by 0 days.

(21) Appl. No.: 10/314,835

(22) Filed: Dec. 9, 2002

(65) Prior Publication Data

US 2003/0106236 A1 Jun. 12, 2003

(30) Foreign Application Priority Data

Dec. 12, 2001 (CH) .............................................. 1811216

(51) Int. Cl.[7] .............................................. G01B 5/02
(52) U.S. Cl. ....................................................... 33/832
(58) Field of Search .................................. 33/832, 833

(56) References Cited

U.S. PATENT DOCUMENTS

| | | |
|---|---|---|
| 3,996,669 A | 12/1976 | Anichini |
| 4,465,162 A | 8/1984 | Yokota |
| 4,679,326 A | 7/1987 | Takizawa et al. |
| 4,924,598 A | 5/1990 | Gruhler ........................ 33/832 |
| 5,373,645 A | * 12/1994 | Bezinge et al. ............... 33/703 |

FOREIGN PATENT DOCUMENTS

EP    0 834 463 A1    4/1998

* cited by examiner

*Primary Examiner*—Christopher W. Fulton
(74) *Attorney, Agent, or Firm*—Pearne & Gordon LLP

(57) ABSTRACT

Column for measuring longitudinal dimensions (1) comprising:
- a supporting frame (2),
- a carriage (3) capable of moving along a measuring axis (z) along the supporting frame,
- a probe tip (44) connected to said carriage and designed to be brought into contact with the piece to be measured,
- a motorized driving device of the carriage comprising a cable or belt (40) for moving said carriage along said measuring axis and a driving motor (5),
- a system for measuring the position of said carriage (3) along said measuring axis.

The driving motor drives an upper driving pulley through a reducing gear and a friction element. The motor, the reducing gear and the friction element are all integrated inside the pulley.

Advantages: gain of space. Reduction of the number of parts. Reduction of the constraints applied by the driving belt on the carriage.

17 Claims, 2 Drawing Sheets

COLUMN FOR MEASURING LONGITUDINAL DIMENSIONS

This application claims priority of European Patent Application EP01811216.9, the content of which is hereby incorporated.

1. Field of the Invention

The present invention concerns a measuring machine, notably a column for measuring longitudinal dimensions, for example a height-measuring column. The present invention also concerns a motorized driving device that can be used in such a measuring column.

2. Related Art

Height-measuring columns are described for example in document U.S. Pat. No. 4,924,598. They are used for example for measuring or comparing dimensions, for example in mechanical workshops. A measuring column generally comprises a fixed supporting frame with a base, a carriage that can be displaced vertically along the supporting frame, a device for driving the carriage and a system for measuring the carriage's vertical position. A probe tip is connected to the carriage and is designed for being brought into contact with the piece to be measured. Some measuring columns comprise a base provided with means for creating an air-cushion in order to easily displace the height-measuring column on the work surface.

The measuring column described in U.S. Pat. No. 4,924,598 comprises an electric motor lodged in the base and driving the lower pulley through an axle or transmission belt. The lower pulley drives a driving belt coupled to the carriage, as well as a counterweight moving in opposite direction from the carriage. The driving belt is tensed between the lower and the upper pulleys. The carriage comprises wheels for pressing on the guiding rails attached to the supporting frame.

The electronic measuring system allows the position of the carriage, and thus of the probe tip, to be determined and displayed on an electronic display. The resolution and precision that is expected of this type of measuring columns is on the order of the micron.

This precision depends for an important part on the contact force between the probe tip and the piece to be measured. A substantial contact force causes a flexion of the probe tip and/or of the piece, or even an elastic deformation of the material, that can influence the measuring. The contact force between the probe tip and the piece to be measured must thus be minimal or, in any case, identical at each measuring.

It is thus essential to realize the driving system so that the traction force exerted on the carriage should be reproducible and independent from the carriage's longitudinal position. For this purpose, it is important to make sure that the driving belt is sufficiently tensed so that it does not slide on the driving pulley. A significant tension will however cause forces and moments on the carriage that can vary according to the carriage's position and thus influence the measuring. In order to absorb these constraints and reduce the play, it is necessary to reduce as much as possible the play between the carriage's wheels and the guiding rails on the supporting frame. A strong pressure between the carriage's wheels and the rails increases however the wheel's resistance, which makes displacing the carriage difficult and even noisy. A significant wheel resistance furthermore causes an even greater traction force of the driving belt, which further increases the constraints exerted by the driving belt on the carriage and on the probe tip.

Furthermore, the space requirement and the weight of the measuring column should be reduced and the number of distinct parts should be limited. A heavy and cumbersome column, constituted of many distinct elements, is difficult to operate, expensive to make and transport and is more likely to break down and to malfunction.

Furthermore, the use of a belt between the motor and the driving pulley is an additional source of friction and play, which is detrimental to the accuracy of the driving and thus to the measuring accuracy. It is not possible for the pulley to be directly driven by the motor when the carriage can be moved by hand by the user; during sudden displacements, the motor could be damaged by the generated electric tension.

It is an aim of the present invention to propose a column for measuring longitudinal dimensions that avoids the disadvantages of the prior art columns. In particular, it is an aim of the present invention to make a column for measuring longitudinal dimensions in which the carriage's driving belt or cable is less tensed than in the prior art devices and whose total space requirement is reduced.

BRIEF SUMMARY OF THE INVENTION

According to the invention, these aims are achieved by means of a measuring column comprising the characteristics of claim 1, preferred embodiments being furthermore indicated in the dependent claims.

In particular, these aims are achieved in that the motor driving the driving belt is placed in the upper part of the supporting frame.

This has the advantage that the belt's tension at the upper driving pulley is produced only by the carriage's mass and the counterweight, without additional tensors being necessary. The tension at the lower pulley being not critical, it is possible to use driving belts less tensed than in the prior art.

These aims are further achieved by means of a motorized driving device comprising a pulley, a driving motor and a friction element, in which the driving motor and the friction element are integrated inside the pulley.

This characteristic has the advantage of allowing a construction that is extremely compact and light and also economical, as will be seen.

DESCRIPTION OF THE DRAWINGS

The invention will be better understood by reading the description of a preferred embodiment given by way of example and illustrated by the attached drawings, in which.

DETAILED DESCRIPTION OF THE INVENTION

Figure 1:
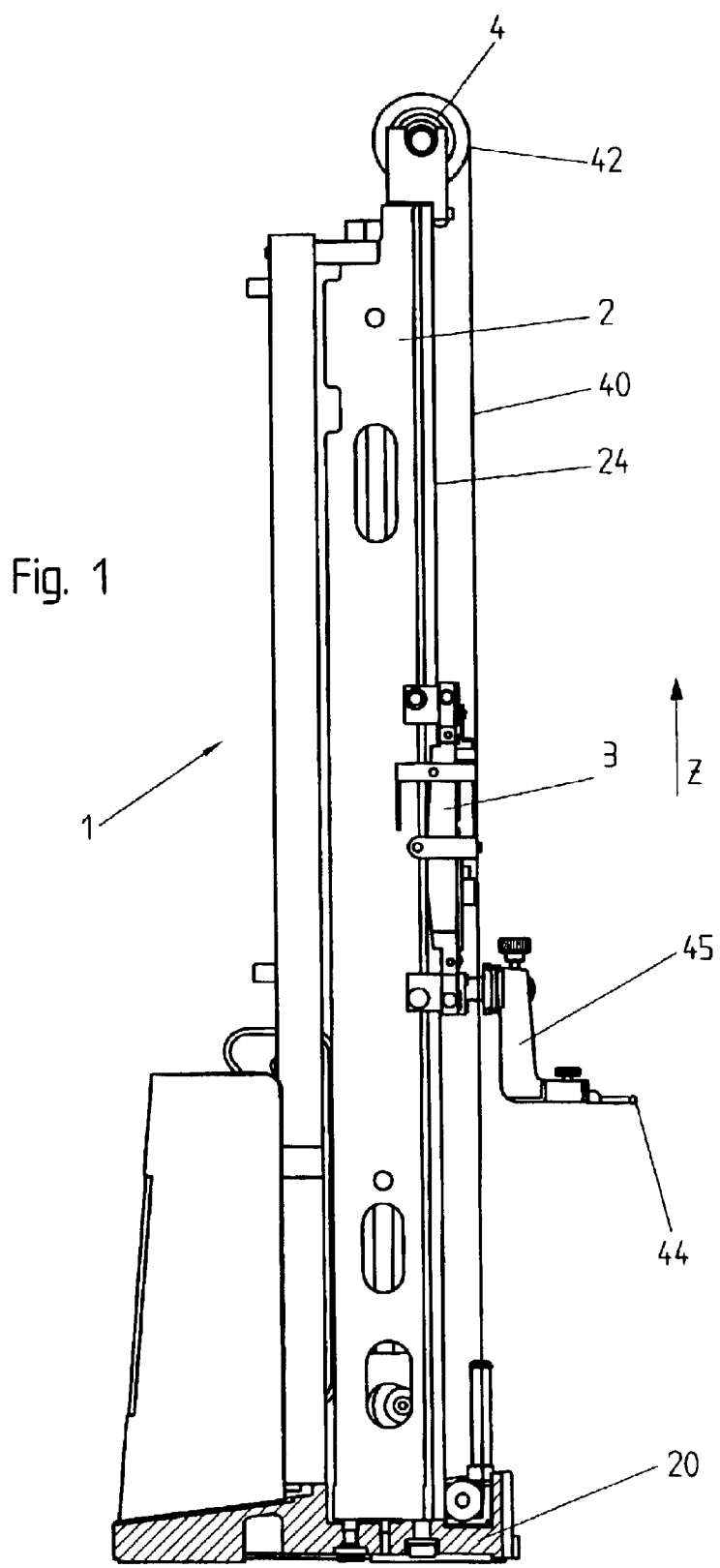
FIG. 1 shows a lateral view of a column for measuring longitudinal dimensions according to the invention.

An embodiment of the measuring column according to the invention comprises a vertical supporting frame 2 mounted perpendicularly on a base 20. The supporting frame comprises a front side provided with a rule (not represented) and with guiding rails 24. The rule is provided with capacitive or magnetic electrodes, for example, that allow a measuring of absolute or relative position by means of a sensor (not represented) mounted on the carriage 3. The rails 24 can be added to, or preferably worked on to the supporting frame 2 and constitute a plane supporting surface on which the wheels of the carriage 3 move. Other rails on the rear side of the supporting frame 2 form a rear wheeling surface for additional wheels.

A motorized driving mechanism linked to the supporting frame comprises an upper pulley 42 and a lower pulley (not represented). The driving mechanism further comprises a motor that will be described in relation with FIG. 2 and that enables the upper pulley 42 to be driven in rotation, as well as a cable or belt 40 forming a loop tensed between the two pulleys. The carriage 3 is fastened on the first end of the belt 40 and can thus be driven along the vertical axis z by means of the motor. A counterweight (not represented) fastened on the other end of the belt 40 moves in opposite direction to the carriage 3 inside the supporting frame 2. The traction force of the belt 40 is controlled precisely for example by means of a friction element, that will be described hereafter, placed between the motor and the driving pulley and/or by controlling the motor's driving torque.

A probe tip 44 is mounted on the carriage 3 by means of a tip holder 45. The spherical extremity of the probe tip 44 is designed to be brought into contact with the piece to be measured. A measuring system of the capacitive, inductive, opto-electronic or magneto-resistive type allows the position of the probe tip 44 or the displacement effected by the probe tip 44 between two measure points to be displayed on an electronic display (not represented). The measuring system comprises for example an electronic sensor mounted on the carriage 3 opposite the rule 22 and connected by a flexible cable mat (not represented), possibly by a local radio connection, to a measuring control and display console.

Figure 2:
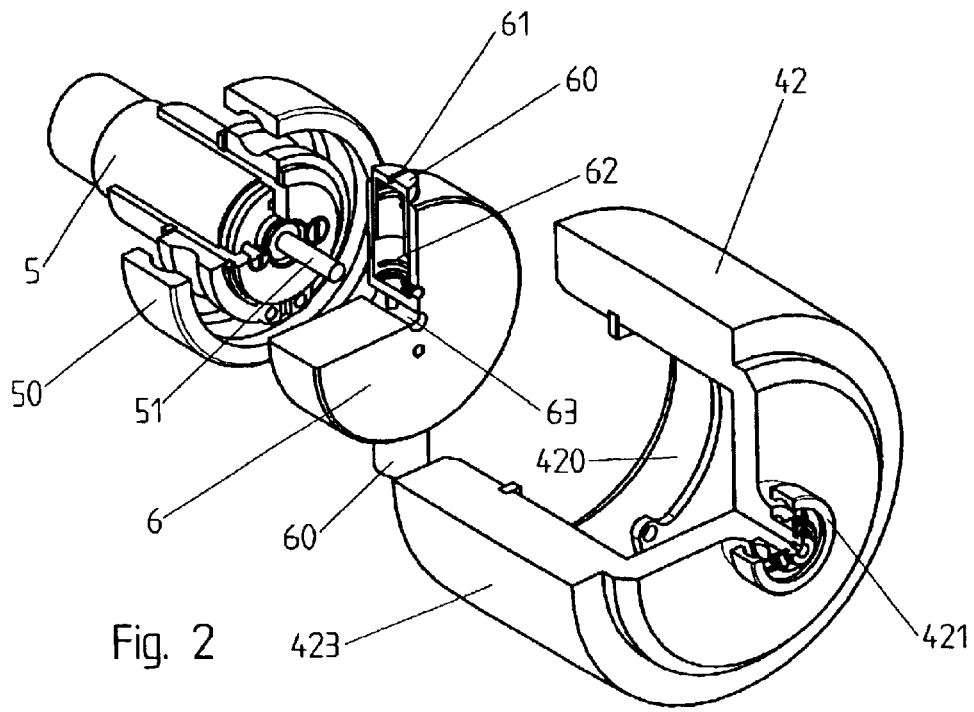
FIG. 2 shows an exploded view of the motor, of the friction element and of the upper pulley.
Figure 3:
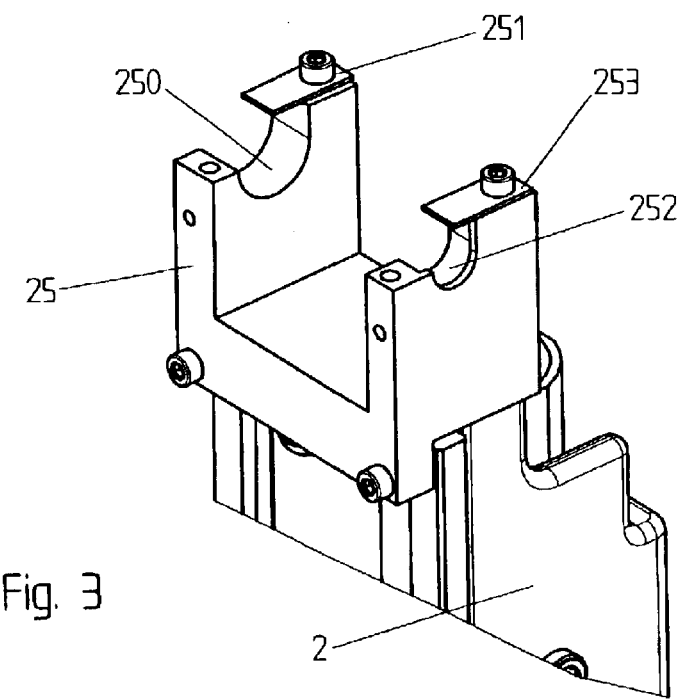
FIG. 3 shows a perspective view of the holding fork of the driving mechanism over the supporting frame.

The motorized driving device is illustrated in more detail in FIGS. 2 and 3. It comprises an upper pulley 42 driving the belt 40 (not represented) by friction on its outer side 423. The pulley 42 can be driven in rotation in both directions and with a variable speed by means of the integrated driving motor 5. The electric motor 5 preferably comprises an integrated reducing gear in order to reduce the rotational speed of the axle 51 and increase the transmitted torque. A friction wheel 6 is driven in rotation by the axle 51 engaged in the opening 63. The wheel 6 comprises in this example two friction blocks 60 pressed each by a spring or elastic element 62 against the inner side 420 of the upper pulley 42. In a variant embodiment, one could have a single spring pressing on both blocks, this embodiment compensating better the shape defect (un-round) of the inner side of the upper pulley. The friction surface of the friction blocks 60 is preferably convex with the same curvature diameter as the inner side 420 and comprises one or several grooves 61 through which the possible dust particles or tiny shavings between the two friction surfaces can be evacuated. The driving of the pulley 42 is realized by the friction pairing between the blocks 60 and the pulley 42; this pairing is determined by the springs 62. The springs 62 are used in their linear operating zone, i.e. the resting pressure of the blocks 60 against the surface 420 depends very little on the thickness of the blocks 60.

The body of the motor 5 is held by a spring 251 in a scalloping 250 provided in a fork 25 placed on top of the supporting frame 2. A ball bearing 50 (represented without the balls) enables the pulley 42 to turn around the body of the motor. The pulley 42 is held through a second bearing 421 by a second spring 253 in a second scalloping 252 provided at the other end of the fork 25.

It will be noted that this construction is extremely compact and that the space requirement can thus be reduced. Furthermore, it uses mainly lathe-turned pieces 50, 6, 60, 42, 421 that are easy to work and thus economical.

The driving belt 40 is tensed on the outer side of the pulley 42 only by the weight of the carriage 3 on one of the two ends and by the weight of the counterweight on the other end. No additional tensor is thus required (although possible), which allows the construction to be simplified. The tension on the belt 40 can thus be reduced, which limits the constraints applied on the carriage 3 and improves accuracy.

The friction element 6 enables the torque transmitted by the driving motor 5 to the pulley 42 to be controlled, and in particular to be limited to a predetermined value notably when the probe tip 44 presses against the piece to be measured. The pressing force of the probe tip 44 against the measured piece is thus determined by the characteristics of the friction element 6, notably by the characteristics of the springs 62. Inversely, the friction element 6 also makes it possible to protect the motor from excessive heating or even from destruction when the carriage is moved suddenly by hand or when the carriage's movement is blocked.

The driving motor 5 is controlled by control electronics (not represented) enabling to vary the motor's current so as to control the speed of rotation and the driving torque. It is also possible, within the framework of this invention, to control the driving torque and thus the pressing force of the probe tip 44 by acting on this current. This electric control can be performed in addition or instead of the mechanic control of the torque performed by means of the friction element 6.

The preferred arrangement of the motorized driving device with the pulley 42, the driving motor 5 and the friction element 6 on top of the measuring column is advantageous, as has been seen, for reducing the necessary tension on the driving belt 40. It is however also possible within the framework of this invention to enjoy the benefits of a compact and integrated construction by placing the described and claimed driving device on the bottom of the measuring column.

What is claimed is:

1. A column for measuring longitudinal dimensions comprising:
   a supporting frame,
   a carriage capable of moving along a measuring axis along the supporting frame,
   a probe tip connected to said carriage and designed to be brought into contact with the piece to be measured,
   a motorized driving device of the carriage comprising a cable or belt for moving said carriage along said measuring axis and a driving motor,
   a system for measuring the position of said carriage along said measuring axis,
   wherein said driving motor is placed on the upper part of said supporting frame.

2. The measuring column of claim 1, said cable or said belt forming a loop tensed between an upper pulley on the upper part of said supporting frame and a lower pulley on the lower part of said supporting frame, said carriage being mounted on one of the ends of said loop, a counterweight being mounted on the other of said two ends of said loop, said driving motor enabling said upper pulley to be driven in rotation.

3. The measuring column of claim 2, said driving motor driving said upper pulley through a reducing gear.

4. The measuring column of claim 2, said driving motor driving said upper pulley through a friction element.

5. The measuring column of claim 4, said driving motor and said friction element being integrated inside said upper pulley.

6. The measuring column of claim 5, a bearing being provided between the body of said driving motor and the inner side of said upper pulley.

7. The measuring column of claim 5, said friction element comprising a friction wheel driven by said driving motor, said friction wheel driving itself said upper pulley through at least one friction block.

8. The measuring column of claim 7, said friction force between said at least one friction block and said upper pulley being determined by a spring pressing said friction block against the inner side of said upper pulley.

9. The measuring column of claim 7, said at least one friction block comprising at least one groove on its friction surface.

10. The measuring column of claim 1, wherein said driving motor is controlled by control electronics allowing to vary the current of said motor so as to control the driving torque.

11. The measuring column of claim 2, wherein said driving motor and said upper pulley are mounted on a fork on the top of said supporting frame, the body of said driving motor being held by one of the ends of said fork and said upper pulley being connected to the other end of said fork through a bearing.

12. A motorized driving device capable of being used in the measuring column of claim 1 and comprising:

a pulley, a driving motor, a friction element, said driving motor and said friction element being integrated inside said pulley.

13. The motorized driving device of claim 12, said driving motor driving said friction element through a reducing gear.

14. The motorized driving device of claim 12, a bearing being provided between the body of said driving motor and the inner side of said pulley.

15. The motorized driving device of claim 12, said friction element comprising a friction wheel driven by said driving motor, said friction wheel driving itself said pulley through at least one friction block.

16. The motorized driving device of claim 15, said friction force between said at least one friction block and said pulley being determined by a spring pressing said friction block against the inner side of said upper pulley.

17. The motorized driving device of claim 16, said at least one friction block comprising at least one groove on its friction surface.

* * * * *